United States Patent
Mokhasi et al.

(10) Patent No.: US 12,107,972 B2
(45) Date of Patent: Oct. 1, 2024

(54) SYSTEM AND METHOD FOR DYNAMIC KNOWLEDGE-BASED AUTHENTICATION

(71) Applicant: Visa International Service Association, San Francisco, CA (US)

(72) Inventors: Gaurav Srikant Mokhasi, Evanston, IL (US); Abhishek Minocha, New Delhi (IN); Rohit Sukhija, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/717,374

(22) Filed: Apr. 11, 2022

(65) Prior Publication Data

US 2022/0231866 A1 Jul. 21, 2022

Related U.S. Application Data

(63) Continuation of application No. 16/424,885, filed on May 29, 2019, now Pat. No. 11,329,832.

(51) Int. Cl.
*H04L 9/32* (2006.01)
*G06Q 20/02* (2012.01)
(Continued)

(52) U.S. Cl.
CPC ........... *H04L 9/3271* (2013.01); *G06Q 20/02* (2013.01); *G06Q 20/3226* (2013.01);
(Continued)

(58) Field of Classification Search
CPC .. H04L 9/3271; G06Q 20/02; G06Q 20/3226; G06Q 20/341; G06Q 20/4014; G06Q 20/4097
(Continued)

(56) References Cited

U.S. PATENT DOCUMENTS 8,250,632 B1 * 8/2012 Staddon .............. G06F 16/9535
726/4
8,955,066 B1 * 2/2015 Ackerman ............ G06F 21/316
726/5
(Continued)

FOREIGN PATENT DOCUMENTS

CN 101473344 A * 7/2009 ........... G06Q 20/085
WO 2014078154 A2 5/2014

OTHER PUBLICATIONS

"Enhancing security and privacy in biometrics-based authentication systems," by N.K. Ratha; J.H. Connell; R.M. Bolle. Published In: IBM Systems Journal. vol. 40, Issue: 3, 2001. Accessed via IEEE Xplore. Abstract only. (Year: 2001).*

(Continued)

*Primary Examiner* — Sara C Hamilton
(74) *Attorney, Agent, or Firm* — The Webb Law Firm

(57) ABSTRACT

The present disclosure relates to knowledge based authentication whereby a user is authenticated through third-party linked accounts. The method includes receiving an authentication request from a merchant computer, assessing one or more data fields to generate an authentication challenge for the user, connecting to one or more third-party account service provider to extract user-related data, generating the authentication challenge based on the extracted user-related data from the third-party account service provider, posing the authentication challenge to the user on a user device, receiving a response to the authentication challenge, and returning the authentication response to the merchant.

20 Claims, 4 Drawing Sheets

(51) Int. Cl.
*G06Q 20/32* (2012.01)
*G06Q 20/34* (2012.01)
*G06Q 20/40* (2012.01)

(52) U.S. Cl.
CPC ....... *G06Q 20/341* (2013.01); *G06Q 20/4014* (2013.01); *G06Q 20/4097* (2013.01)

(58) Field of Classification Search
USPC ........................................................ 713/168
See application file for complete search history.

(56) References Cited

U.S. PATENT DOCUMENTS

| | | | | |
|---|---|---|---|---|
| 9,514,407 | B1* | 12/2016 | Dotan | G06N 5/022 |
| 10,362,016 | B2* | 7/2019 | Hwang | G06F 21/31 |
| 2008/0005037 | A1* | 1/2008 | Hammad | G06Q 20/3821 |
| | | | | 705/67 |
| 2009/0327131 | A1* | 12/2009 | Beenau | G06F 21/316 |
| | | | | 713/182 |
| 2012/0072975 | A1* | 3/2012 | Labrador | G06Q 20/382 |
| | | | | 726/6 |
| 2013/0103584 | A1 | 4/2013 | Eichner et al. | |
| 2013/0144785 | A1* | 6/2013 | Karpenko | G06Q 20/425 |
| | | | | 705/44 |
| 2014/0137203 | A1* | 5/2014 | Castro | H04L 67/02 |
| | | | | 726/4 |
| 2014/0137219 | A1* | 5/2014 | Castro | H04L 67/02 |
| | | | | 726/6 |
| 2014/0189829 | A1 | 7/2014 | McLachlan et al. | |
| 2015/0106216 | A1 | 4/2015 | Kenderov | |
| 2016/0012427 | A1 | 1/2016 | Van Heerden et al. | |
| 2016/0191498 | A1* | 6/2016 | Marien | H04L 9/3271 |
| | | | | 726/7 |
| 2017/0300915 | A1* | 10/2017 | Kenderov | G06Q 20/20 |
| 2017/0324752 | A1* | 11/2017 | Todasco | H04L 63/0853 |
| 2017/0344729 | A1 | 11/2017 | Kohli | |
| 2018/0205727 | A1* | 7/2018 | Hwang | H04L 63/08 |
| 2018/0293579 | A1* | 10/2018 | Tetali | G06Q 20/3674 |
| 2018/0351929 | A1* | 12/2018 | Kohli | G06Q 20/363 |
| 2020/0053074 | A1* | 2/2020 | Lum | G06F 21/31 |
| 2020/0110866 | A1* | 4/2020 | Greenberger | G06F 21/36 |
| 2020/0193443 | A1* | 6/2020 | Piel | G06Q 20/382 |
| 2020/0313910 | A1* | 10/2020 | Lindemann | H04L 9/3231 |

OTHER PUBLICATIONS

Ratha et al., "Enhancing Security and Privacy in Biometrics-Based Authentication Systems", IBM Systems Journal, IEEE Xplore, 2001, vol. 40, No. 3.

* cited by examiner

SYSTEM AND METHOD FOR DYNAMIC KNOWLEDGE-BASED AUTHENTICATION

CROSS-REFERENCE TO RELATED APPLICATION

This application is a continuation of U.S. patent application Ser. No. 16/424,885 filed, May 29, 2019, the disclosure of which is hereby incorporated by reference in its entirety.

BACKGROUND

1. Technical Field

The present disclosure relates to authentication. More specifically, the disclosure relates to knowledge-based authentication.

2. Technical Considerations

Authentication is a process of verifying and validating the identity of a user to confirm that the user is who they say they are. The user's identity is validated using something the user has, something the user is, something the user knows, or one more combinations of the factors mentioned above. In the ever-evolving world of technology, authentication systems have also evolved for providing seamless user experience and to reduce fraudulent activities. Authentication systems use one or more authentication factors to authenticate the identity of a user. Examples of authentication factors may include, a hardware-security token, password, biometric identity, behavioral identity, device identity and the like. In some cases, authentication may be performed via multifactor authentication, where more than one of such identity factors are tested to authenticate the user.

Existing authentication processes have various shortcomings. There are serious security flaws in the design of the existing authentication process. It is possible to mimic the authentication of the user using various fraudulent methods. The other reason for the vulnerability of the existing authentication methods are because of man-in-the-middle attack. Since the authentication factors are constant such as OTP or a static answer, by design these systems are not secure enough. The other factors contributing to the authentication flaws include bad passwords, easily hackable passwords, brute-forcible login credentials, static answers and passwords and the like. Thus, what is needed are techniques for overcoming these and other challenges.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

Figure 1:
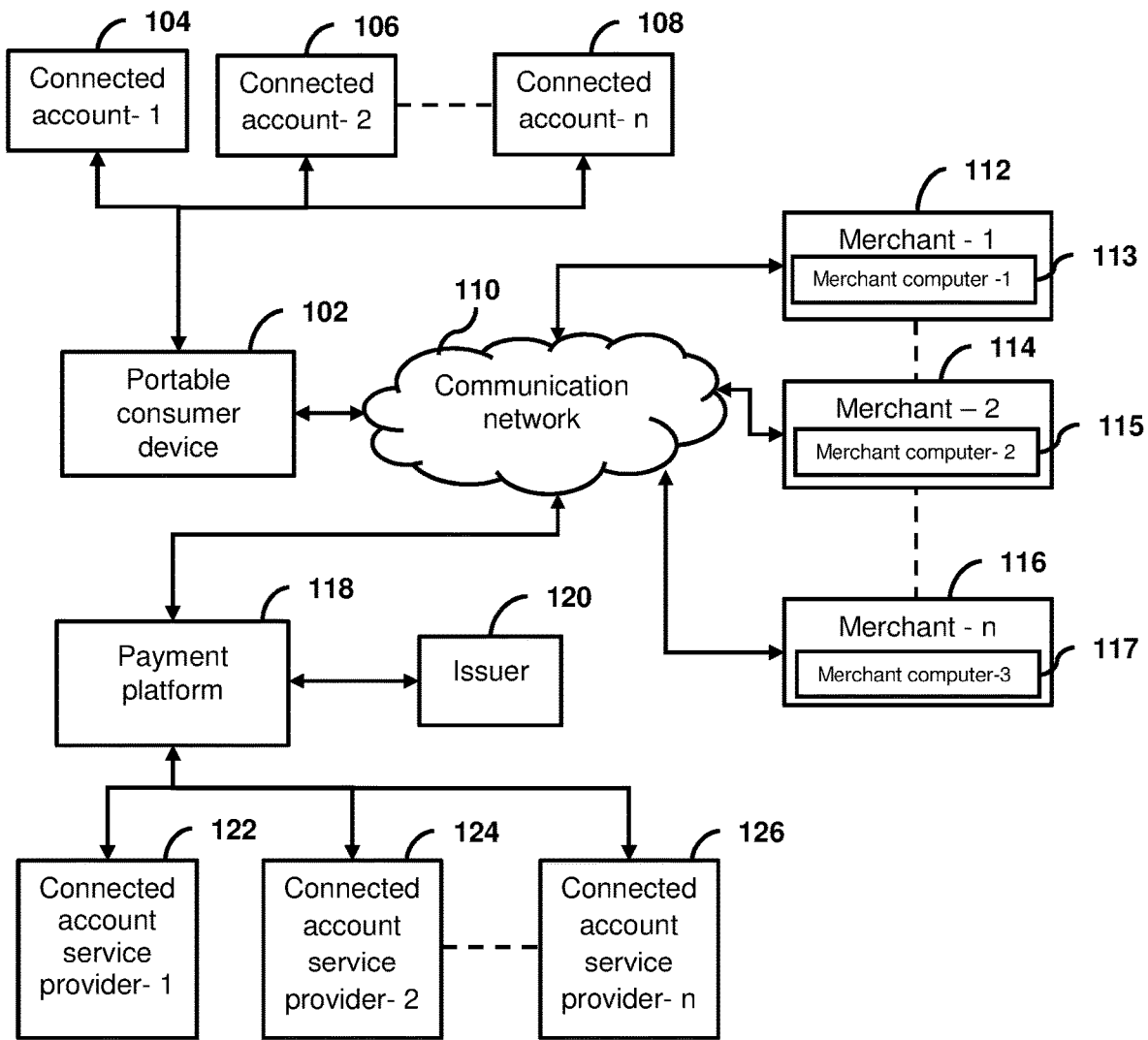
FIG. 1 is a block diagram of system illustrating an authentication system using third-party accounts, in accordance with one or more embodiments.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present disclosure. It will be apparent, however, that the example embodiment(s) may be practiced without these specific details. In other instances, well-known structures and devices are shown in block diagram form in order to avoid unnecessarily obscuring the example embodiment(s).

As an initial matter, some terms can be described in further detail.

An "access device" may be any suitable device that provides access to a remote system. An access device may also be used for communicating with a portable device, a network computer, an authorizing entity computer, or any other suitable system. An access device may generally be located in any suitable location, such as at the location of a merchant. An access device may be in any suitable form. Some examples of access devices include point of sale (POS) devices (e.g., POS terminals), cellular phones, personal digital assistants (PDAs), personal computers (PCs), tablet PCs, handheld specialized readers, set-top boxes, electronic cash registers (ECRs), automated teller machines (ATMs), virtual cash registers (VCRs), kiosks, security systems, access systems, and the like. In some embodiments, an access device can be a device that acts as a payment terminal at a gas station or other location. In some embodiments, where an access device may comprise a POS terminal, any suitable POS terminal may be used and may comprise a reader, a processor, and a computer-readable medium. An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards.

A "portable device" may comprise any suitable electronic device that may be operated by a user, which may also provide remote communication capabilities to a network of remote communication capabilities include using a mobile phone (wireless) network, wireless data network (e.g., 3G, 4G, or similar networks), Wi-Fi®, Wi-Max™, or any other communication medium that may provide access to a network such as the Internet or a private network. Examples of portable devices are mobile phones (e.g., cellular phones), PDAs, tablet computers, net books, laptop computers, personal music players, hand-held specialized readers, etc. Further examples of portable devices are wearable devices, such as smart watches, fitness bands, ankle bracelets, rings, earrings, etc., as well as automobiles with remote communication capabilities. In some embodiments, a portable device can function as a payment device (e.g., a portable device can store and be able to transmit payment credentials for a transaction). A "portable consumer device" may be an example of a "portable device." A portable consumer device may refer to any instrument that enables the user to make payments to a merchant. The portable consumer device may be a static instrument which provides user credentials for enabling the transactions. A credit card, a debit card, a prepaid card and a gift card may be examples of the portable consumer device.

"Transaction data" may refer to information associated with a transaction. For example, transaction data may comprise one or more of an authorized amount (e.g., transaction amount, item value, etc.), other amount, terminal country code, terminal verification results, transaction currency code, transaction date, transaction type (e.g., card-present transaction, card-not-present transaction, high value transaction, low value transaction, local transaction, international transaction, etc.), an unpredictable number, application interchange profile (AIP), application transaction counter (ATC), issuer application data (IAD), etc.

A "user" may include an individual. In some embodiments, a user may be associated with one or more personal accounts and/or portable devices. The user may also be referred to as a cardholder, account holder, or a consumer.

"Credentials" may comprise any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV, a dCVV, a PAN, a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction-processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer.

An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "network computer" may refer to a computer or a network of computers that processes transactions. In some embodiments, the network computer can be in an electronic system used to accept, transmit, or process transactions made by user devices for money, goods, services, or access to locations or data. The network computer may transfer information and funds among issuers, acquirers, transacting parties, and users. An example of the network computer may include a payment processing server computer such as VisaNet®, operated by Visa®. Payment processing server computers such as VisaNet® are able to process credit card transactions, debit card transactions, and other types of commercial transactions. VisaNet®, in particular includes a Visa Integrated Payments (VIP) system which processes authorization requests and a Base II system which performs clearing and settlement services. In other embodiments, a network computer can be a collection of computers that can allow access to a person seeking to access a particular location. In yet other embodiments, a network computer can be a collection of computers that can allow access to specific types of data (e.g., governmental agencies).

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "payment platform" may refer to an environment which has multiple abstraction levels, a computer architecture and one or more hardware and software tools for enabling a transaction between two parties. The payment platform mostly provides one or more Application Program Interface (API) to issuers, acquirers and merchants on various transaction parameters. The payment platform has one or more services that can be subscribed by other stakeholders in the payment ecosystem for facilitating a transaction. The services may be related to user identity management, loyalty and offers management, risk and fraud mitigation, authentication services, on-behalf authorization, and the like. One such example of the payment platform is VisaNet™ owned and operated by Visa Inc.® which enables money transfer from one account to another account along with a host of other services mentioned above.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

The various embodiments of the present disclosure provide a system and method for dynamic knowledge-based authentication. A user may be authenticated for payment purposes in various ways, including password, biometrics, behavioral authentication, device fingerprinting and the like. The present disclosure describes a knowledge based authentication that maybe used to prove the identity of a user based on the knowledge of private information of the user. According to one or more embodiments of the present disclosure, the knowledge of the private information of the user is obtained from one or more third-party connected accounts and an authentication is posed to the user dynamically based on the private information fetched from the third-party connected accounts.

FIG. 1 is a block diagram of system illustrating an authentication system 100 in which the techniques described herein may be practiced, in accordance with one or more embodiments. Authentication system 100 is programmed or configured provide secure and efficient dynamic knowledge-based authentication. Authentication system 100 may be implemented across one or more physical or virtual computing devices, which is loaded with instructions in a new ordered combination as otherwise disclosed herein to implement the functions and algorithms of this disclosure. The example components of authentication system 100 are implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. Authentication system 100 illustrates only one of many possible arrangements of components configured to execute the programming described herein. Other arrangements may include fewer or different components, and the division of work between the components may vary depending on the arrangement.

Authentication system 100 may include a portable consumer device 102, one or more connected accounts, 104, 106, 108, a communication network 110, one or more merchants 112, 114, 116, a payment platform 118, an issuer 120, and/or one or more connected account service providers 122, 124 and 126. Other computing devices suitable for implementing the example embodiment(s) may have different components, including components with different connections, relationships, and functions.

In one or more embodiments, the portable consumer device 102 is a portable device used by a consumer for making purchases from the merchants 112, 114 and/or 116. As mentioned above, the examples of portable devices are mobile phones (e.g., cellular phones), PDAs, tablet computers, net books, laptop computers, personal music players, hand-held specialized readers, etc. Further examples of portable devices are wearable devices, such as smart watches, fitness bands, ankle bracelets, rings, earrings, headgear etc., as well as automobiles with remote communication capabilities. In some embodiments, a portable device can function as a payment device. For example, the portable device can store and be able to transmit payment credentials for a transaction.

The block diagram further comprises a communication network 110 that facilitates the communication between multiple components in the authentication system 100. The communication network 110 acts as an interface for the portable consumer device 102 to connect with the merchants 112, 114 and/or 116, and the merchant to interact with the payment platform 118. While not shown in the figures, the communication network 110 also aids communication between the payment platform 118 and the issuer 120, and the payment platform 118 and the connected account service providers 122, 124 and/or 126.

The communication network 110 can include wired and/or wireless communication networks and the example of such networks include telecommunication network, radio-communication network, the Internet, intranet, extranet, Wire Area Network (WAN), Local Area Network (LAN), Home Area Network (HAN), Dedicated Short Range Communication (DSRC), Global System for Mobile Communication (GSM), Bluetooth®, General Packet Radio Services (GPRS), Wi-Fi®, ZigBee®, Near-Field Communication (NFC), and the like. The communication network 110 uses one or more communication protocols for facilitating communication between the components in the authentication system 100. The examples of the protocols include, but are not limited to Point-to-Point Protocol (PPP), Transmission Control Protocol (TCP), Internet Protocol (IP), File Transfer Protocol (FTP), Hyper Text Transfer Protocol (HTTP), Serial Line Internet Protocol (SLIP), and the like.

In one or more embodiments, authentication system 100 comprises an issuer 120. Again, as described above, an "issuer" may refer to a business entity (e.g., a bank) that issues and optionally maintains an account for a user. An issuer may also issue payment credentials stored on a user device, such as a cellular telephone, smart card, tablet, or laptop, to the consumer, connected headgear, or in some embodiments, a portable device.

Merchants (112, 114 and 116) are entities that engage in transactions and can sell goods or services, or provide access to goods or services. Merchants (112, 114 and 116) have one or more computing devices used for various computing and/or processing functions, including initiating and processing transactions. Merchant 112 configures merchant computer 113 for initiating and processing transactions. Similarly, merchants 114 and 116 configure merchant computers 115 and 117 respectively for transaction purposes.

Furthermore, authentication system 100 may comprise a payment platform 118 that facilitates a payment transaction between multiple parties involved in the payment ecosystem. Payment platform 118 hosts a number of subunits which are computers which are either standalone or distributed systems. According one or more embodiments of the present disclosure, payment platform 118 includes one or more network computers, one or more payment gateways, authentication modules, tokenization modules, and the like.

Connected accounts (104, 106 and 108) are third-party accounts that are used by the consumer for availing one or more services. Connected accounts (104, 106 and 108) are client-facing applications providing services to the consumer through the portable consumer device 102. Connected accounts (104, 106 and 108) may provide services based on the data stored locally on the portable consumer device 102 or based on the data stored remotely (e.g. in a cloud-based account). Further, there can be multiple services that can be availed by the user using a single connected account. Connected accounts are created by the user by associating one or more personally identifiable information (PII) about the user. For example, a connected account may be created by associating a name, an e-mail ID, a phone number, a social security number, a driving license, a bank account, a credit/debit/game card number, a biometric, and the like. Further, the user is verified using the existing methods of authentication for creating a connected account. Examples of the connected accounts are Netflix®, Google Drive®, Google Photos®, Amazon Prime®, Dropbox®, Microsoft OneNote®, Spotify®, Facebook®, an account affiliated with a social network or service, or any other account-based service or application.

Connected account service providers (122, 124 and 126) are the respective providers of the connected accounts (104, 106 and 108), which are accessible to the user through the portable consumer device 102. Examples of the connected account service providers (122, 124 and 126) include, but are not limited to Netflix Inc.®, Amazon.com®, Alphabet Inc.®, Dropbox Inc.®, Apple Inc.®, Facebook® and the like.

In accordance with the various embodiments of the present disclosure, when a user makes a purchase from the merchant 112 and arrives for the payment stage, the merchant 112 needs to authenticate the user for processing the payment transaction. As a first step of the authentication, the merchant computer 113 is configured to initiate an authentication request to the payment platform 118. The authentication request is initiated through an authentication request message transmitted from the merchant computer 113 to the payment platform 118 through the communication network 110 in a predefined message format. The authentication request message comprises a plurality of fields that allows the payment platform 118 to identify merchant and consumer details. Once the authentication request is received, the payment platform 118 is programmed or configured to parse the authentication request message and extract one or more relevant fields that is used for identification of the merchant and the consumer. The payment platform 118 is further configured to identify the enrollment of the merchant 112 and the enrollment of the consumer using the portable consumer device 102 for a dynamic knowledge-based authentication, and if enrolled proceeds to identify the connected accounts of the consumer.

In accordance with the various embodiments of the present disclosure, knowledge based authentication refers to an authentication method that seeks to authenticate a user based on private knowledge and derived knowledge of the user to prove the user's identity. Knowledge based authentication can have various forms including static knowledge-based authentication and dynamic knowledge-based authentication. In a static knowledge-based authentication, the authentication challenge is based on pre-agreed set of shared secrets whereas in a dynamic knowledge-based authentication, the challenges are generated dynamic and include information from a wider base of the user's personal information. In accordance with the various embodiments of the present disclosure, dynamic knowledge-based authentication is based on the user's engagement and interaction with connected accounts 104, 106 and 108.

Payment platform 118 based on one or more predefined rules or using one or more machine learning techniques connects to one of connected account service providers (122, 124 and/or 126) for generating a dynamic authentication challenge. In accordance with the various embodiments of the present disclosure, payment platform 118 transmits a message to connected account service providers 122, 124 and/or 126 requesting for user engagement activity and the metadata required for generating an authentication challenge for the user. For requesting user engagement activity and metadata, the payment platform 118 first provides primitive information (or identification information) of the user such as user name, user ID, user transaction details with the connected accounts and the like. In accordance with the various embodiments of the present disclosure, primitive information may be described as the information required for identifying the user. Primitive information is stored by payment platform 118 and is shared with the other services such as connected account service providers (122, 124, and/or 126) when required. Further, primitive information of the user may also be stored by the connected account service providers (122, 124, and/or 126) and when the same is shared by the payment platform 118, connected account service providers (122, 124 and/or 126) are able to match these two. Primitive information about the user stored by the payment platform 118 and the connected account service providers (122, 124 and/or 126) act as a bridge to identify the user information from both the parties. The message transmitted by the payment platform 118 to the connected account service providers (122, 124 and/or 126) is through the communication network 110, and the message is in a predefined format. Now, the connected account service providers (122, 124 and/or 126) have one or more computers (not shown in figure) configured for extracting the requested user details for generating an authentication challenge. For example, from a Netflix® account of the user, the extracted user related details may include the latest content viewed by the user. In another example, the user related details may include one of the pictures captured by the user at a particular location and stored in Google Photos™. In yet another example, the user related details may include one or more content shared by the user on a social media platform such as Facebook®.

Dynamic authentication challenge is generated by the connected account service providers (122, 124 and/or 126) based on the fetched user details. The authentication challenge is generated based on the predefined terms between connected account service providers (122, 124 and/or 126) and payment platform 118. One or more connected account service providers (122, 124 and/or 126) are configured to transmit the generated authentication challenge to payment platform 118 in a predefined message format. Payment platform 118, using one or more submodules is configured to receive the generated authentication challenge. Further, payment platform 118 may use machine intelligence techniques to modify or improvise the challenge generated by the connected account service providers (122, 124 and/or 126). The machine intelligence techniques are one or more processes used by computers to effectively perform a tasks without using explicit instruction, relying on patterns and inferences instead.

In accordance with the embodiments of the disclosure, one or more authentication challenges may be generated by connected account service providers (122, 124 and/or 126) and payment platform 118 may choose one of the challenges generated based on one or more predefined rules. The generated authentication challenge is further transmitted to the user's portable consumer device 102 through the communication network 110 using one or more secure communication protocol. The secure communication protocols are selected based on the device type, merchant type, type of the challenge and the like. In accordance with the embodiments of the present disclosure, authentication challenge from payment platform 118 is configured to be delivered in the form that is most suitable to the portable consumer device 102. The suitable form for the delivery of the authentication challenge is determined by payment platform 118 or merchant 112 or both. The suitability for the portable consumer device 102 may be determined based on the device type, device characteristics, capability of the device, and the like. For example, the authentication challenge is delivered in the form of a pop-up, a scrolling message, a static page, a dynamic page and the like. The authentication challenge delivered has one or more fields also called as response field format to receive the response from the user through the portable consumer device 102. The response received from the portable consumer device 102 in the response field format is transmitted to the payment platform 118.

For an example, the dynamically generated authentication challenge could be displayed as "Identify the last movie you watched on Netflix", or "Recognize the date and the person in the displayed image". These authentication challenges are generated by the connected service providers by extracting the user related data when the payment platform 118 triggers the authentication request. Now, based on the knowledge the user possesses, he responds on the answer field provided when the authentication challenge is delivered. The response field has a predefined response field format and supports objective response, subjective response, or a combination of the objective response and subjective response. When the authentication challenge is in the form of an objective question, the response field would be in the form of supporting the objective question. Similarly, when the authentication challenge is in the subjective form which requires the user to respond in a descriptive format, the response field is usually in the free-form format. Likewise, when the authentication challenge is in a form that would require both subjective and objective responses, the response field would be in a format supporting both the formats. Further, a pre-defined timeframe is provided for the response to be entered. When the timeframe for providing the response exceeds, the authentication challenge expires and is no longer valid. The pre-defined timeframe may be decided by the payment platform 118 by using one or more probabilistic models for predicting the amount of time a user would require to provide a response for the authentication challenge generated.

Now, once the response is received from the user on the portable consumer device 102, the system is configured to transmit the response to the payment platform 118. The payment platform 118 receives the user authentication response and is configured to inspect the user authentication response for errors or null values. When the response received from the user through the portable consumer device 102 is an error or a null value, the user authentication response is not validated and the payment platform 118 is programmed to notify all the stakeholders. The stakeholders may include the user, the merchant 112 and the other modules of the payment platform 118 which may be waiting for the further actions. When the response received passes the basic inspection test, the obtained authentication response is transmitted to the connected account service provider 122 for verification of the authentication response. The connected account service provider 122 based on the virtue of the information about the user and the generated authentication challenge, verifies the obtained authentication response provided by the user with an expected response to generate a verification response. The connected account service provider 122 then transmits the verification response to payment platform 118. In accordance with the embodiments of the present disclosure, the verification response with a value of 0 or 1 is generated as an indication of failure or success when the authentication challenge is an objective challenge. Similarly, the verification response is generated as a confidence score when the authentication challenge us of subjective type. For example, for the challenge such as identifying the last watched movie, the authentication success or failure can be in the form of 0 or 1. On the other hand, for the authentication challenges involving identifying patters or trends of the user, a confidence score on a scale of 0 to 5 may be provided. After validating the responses, the connected service provider 122 is programmed to forward the authentication state (failure or success) to payment platform 118 in a predefined message format using predefined communication protocols. Payment platform 118 receives the authentication state, and based on the configured rules, authenticates or fails to authenticate the user. For instance, the user may fail the authentication challenge when payment platform 118 may decide to authenticate the user because of the low confidence score provided by the connected account service provider 122 for the response provided by the user.

Further, payment platform 118 is configured to transmit the authentication status to merchant computer 113. Merchant computer 113 is configured to receive the authentication response, and if the authentication is success, then an authorization request is transmitted from merchant computer 113 to payment platform 118. Payment platform 118 further transmits the authorization request to the issuer 120. Issuer 120 comprises one or more computers that receives the authorization request for the user from the merchant computer 113 and based on one or more pre-configured rules, approves or declines the transaction. The transaction response from the issuer 120 is again transmitted to the merchant computer 113 through the payment platform 118. The merchant computer 113 notifies the transaction response to the user through the portable consumer device 102.

With increase in the computing power and the advancement of technology, authentication systems are now able to use knowledge-based authentication, which validates the user's identity based on the user's responses to one or more challenge questions generated in real-time from the data corresponding to the user. Often the challenges generated utilize the metadata of the user, thereby making it difficult for anyone other than the actual user to respond to the challenge and obtain access to secured information.

Figure 2:
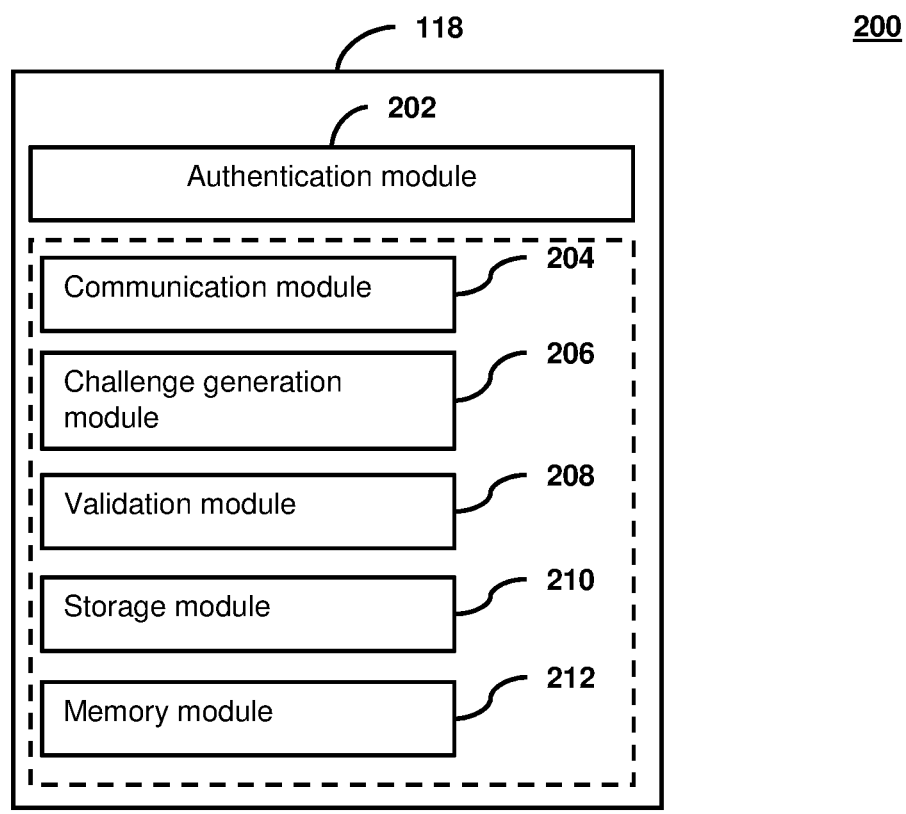
FIG. 2 is a block diagram illustrating a network computer, in accordance with one or more embodiments.

FIG. 2 is a block diagram 200 illustrating a payment platform used for authenticating the user, in accordance with one or more embodiments. The payment platform 118 comprises an authentication module 202, a communication module 204, a challenge generation module 206, a validation module 208, a storage module 210 and a memory module 212.

The payment platform 118 is programmed to function as more than one entity in the financial ecosystem and has an authentication module 202, which functions as an authentication entity when a user has to be authenticated while making a purchase. The authentication module 202 may be present as an independent computing system or as a connected system alongside the other modules of the payment platform 118. In accordance with the various embodiments of the present disclosure, authentication module 202 is programmed or configured to authenticate the user in multiple ways including authenticating the user by posing a dynamic challenge based on the accounts connected to the user. Authentication module 202 in the present disclosure has multiple submodules aiding for the authentication through connected accounts, namely communication module 204, challenge generation module 206, validation module 208, storage module 210 and memory module 212.

Communication module 204 is programmed or configured to provide a communication interface for communicating with the internal and external components of the authentication module 202. Communication module 204 uses one or more communication protocols that uses a variety of communication networks such as Internet, intranet, wired and wireless protocols, telecommunication network, NFC, radio network, and the like. Communication module 204 uses standard communication protocols to make a communication with the other components of the system.

Challenge generation module 206 is programmed or configured to generate one or more challenges for the authentication of the user. Further, challenge generation module 206 is programmed or configured to generate the authentication challenge by using predefined rules and using the user information, merchant information, and the connected account service provider information independently or by communicating these details with the external connected service provider. Challenge generation module 206 is further configured to communicate the generated challenge to the user by utilizing the communication module 204. Challenge generation module 206 co-operates with the external connected service provider for generating the authentication challenge. For this, initially the primitive user details are shared by the payment platform to the external service providers and then the user engagement and interaction of the user with the third-party connected account is retrieved. Further, based on the user activity and the interaction with the third-party connected account, a dynamic authentication challenge is generated. According to various embodiments of the present disclosure, challenge generation module 206 is programmed or configured to generate the authentication challenge independently or in conjunction with the third-party connected accounts. Further, challenge generation module 206 may be configured to generate the authentication challenge with the one or more connected third-party service providers, and choose just one of them to be posed to the user on the user's portable consumer device. The choosing of the authentication challenge may be based on a plurality of factors including user's privacy setting, the user's device configuration, user's location, the demographic of the user, rules set by the user for receiving the authentication challenge and the like. Further, choosing the authentication challenge out of the generated authentication challenges may also depend on the transaction amount and the purchase goods, merchant category code and the like. Therefore, challenge generation module 206 is configured to consider all the above-mentioned factors and generate just one authentication challenge at once or generate multiple authentication challenges and pose one of those to the user, or generate multiple authentication challenges and pose all the generated authentication challenges to the user on the user's portable consumer device.

Validation module 208 is configured to validate the responses of the user for the generated authentication challenge. Initially, validation module 208 is designed to wait for a predetermined time to receive a response from the user for the authentication challenge. Once the response from the user is received, validation module 208 is configured to run one or more compliance tests for the response received. When the basic compliance test passed, validation module 208 further validates the response by comparing the received response with the expected response. In accordance with the embodiments of the present disclosure, validation module 208 may validate the responses for the authentication challenge independently or by communicating the responses to the external connected service provider. Once the validation is complete, validation module 208 is configured to update the authentication status to the other modules of authentication module 202, and also to the broader parts of the authentication ecosystem. The authentication status determined by validation module 208 (or authentication module 210?) is updated to the merchant computers by the payment platform 118, which is then processed for further action including requesting an authorization response to the issuer through the payment platform 118.

Storage module 210 is programmed or configured to store data including details of plurality of users, plurality of merchants, and plurality of connected service providers. The details, such as the user name, user profile, connected accounts of the users, merchant name, merchant profile, payment credentials of the of the user, usage of the user, and the like, are stored by storage module 210.

Authentication module 202 hosts the memory module 212 programmed or configured to store information required for working of the authentication module 202. The memory module 212 comprise primary memory, secondary memory, and other forms of memory that are required for operating the authentication module 202.

Figure 3:
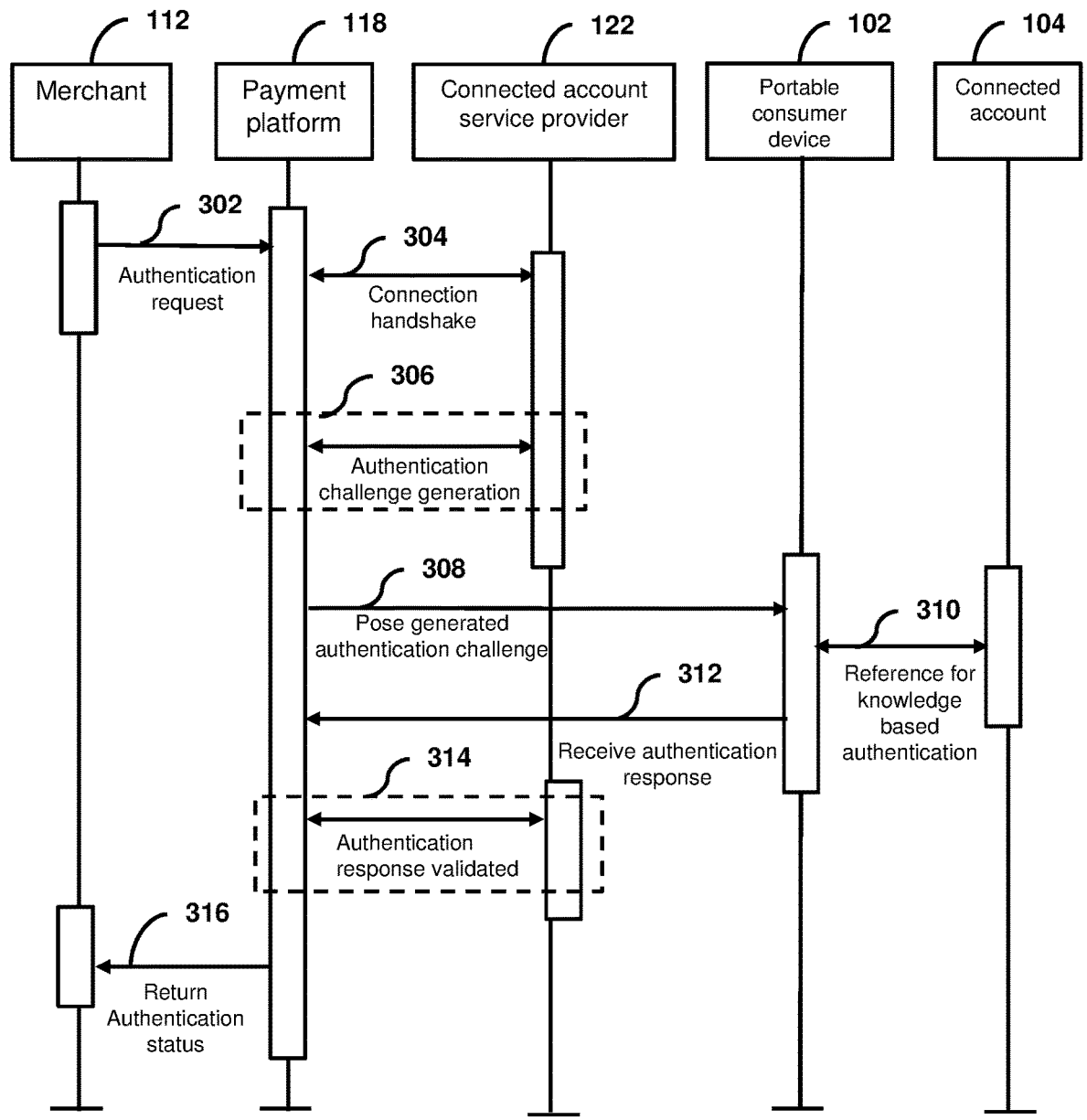
FIG. 3 is a sequence diagram explaining the authentication flow using third-party accounts during a payment transaction, in accordance with one or more embodiments.

FIG. 3 is a sequence diagram explaining the authentication process 300 using third-party connected accounts during a payment transaction, in accordance with one or more embodiments. The authentication process 300 starts when merchant 112 using one of the merchant computers 113 (not shown in FIG. 3) sends an authentication request for a customer to the payment platform 118 (Step 302). The authentication request from merchant 112, is made in the form of message call using predefined protocols that enable the payment platform 118 to fetch user details, merchant details and the connected service providers affiliated to the user. Further, an authentication session starts when the merchant 112 makes an authentication call to the payment platform 118.

Payment platform 118 fetches the details from the authentication request and initiates a handshake with the connected account service provider 122 (Step 304). At this step, the handshake request using one or more handshake protocols is initiated by the payment platform 118. A response is sent by connected account service provider 122 to payment platform.

After the handshake is established between the payment platform 118 and the connected account service provider 122, a dynamic authentication challenge is generated either by the connected account service provider 122 or by the payment platform 118 or jointly (Step 306). In accordance with the various embodiments of the present disclosure, payment platform 118 may communicate with connected account service provider 122 to fetch the user details with respect to the connected account and generate an authentication challenge or share the user details and the merchant details with the connected account service provider 122 to create an authentication challenge. While communicating with the third-party account service provider, payment platform 118 initially shares the primitive user details for enabling the third-party account service providers to identify the user and possible retrieve the user profile for the identified user. The authentication challenge generated is based on the usage and the engagement of the user with the connected account service provider 122. The authentication challenge generated may be based on the predefined rules or may be with the use of techniques such as machine learning and artificial intelligence.

Now, after the generation of the authentication challenge, the payment platform 118 poses the authentication challenge to the user through the portable consumer device 102 (Step 308). Payment platform 118 optimizes the authentication challenge based on number of factors including but not limited to user profile, merchant profile, device profile, connected service account profile and the like. Further, payment platform 118 also monitors the time taken by the user to respond for the authentication challenge.

The user through his or her portable consumer device 102 may optionally engage with the connected account 104 for responding to the challenge posed by the payment platform 118 (Step 310). For example, if the authentication challenge sent in Step 308 asked "What as the last content you watched on Netflix®?" the user may optionally connect with his or her Netflix® account to check the last watched content. Engaging with the connected account for accessing the information requested may require additional authentication which may be posed by the connected account.

The user now responds to the authentication challenge in the response field provided (Step 312) by transmitting the response to the payment platform 118. The response provided by the user may include an objective response, a subjective response, or a combination of both.

The payment platform 118 receives the authentication response and proceeds with validating the response in conjunction with the connected account service provider 122 (Step 314). In accordance with the embodiments of the present disclosure, the payment platform 118 may validate the response of the user locally if the user provided response and the expected response is available with the payment platform 118 itself. In case the response is not available with payment platform 118 locally, payment platform 118 contacts the connected account service provider 122 for validating the response provided by the user by sharing the user response. The authentication can have two states, an authentication success state or an authentication failure state. Further, if the authentication response is not received in a predetermined time period, the authentication request expires and the authentication status will be determined as authentication failure. Once the response is validated, the state of the authentication is determined. In an embodiment, the authentication state may be expressed using 0 or 1, 0 for authentication failure and 1 for authentication success.

Once the authentication state is determined, the authentication state is updated to merchant 112 through a standard communication message using predetermined protocols (Step 316), merchant 112 can process the transaction further. When the authentication is successful, merchant 112 may proceed to send an authorization request to the issuer through payment platform 118.

Figure 4:
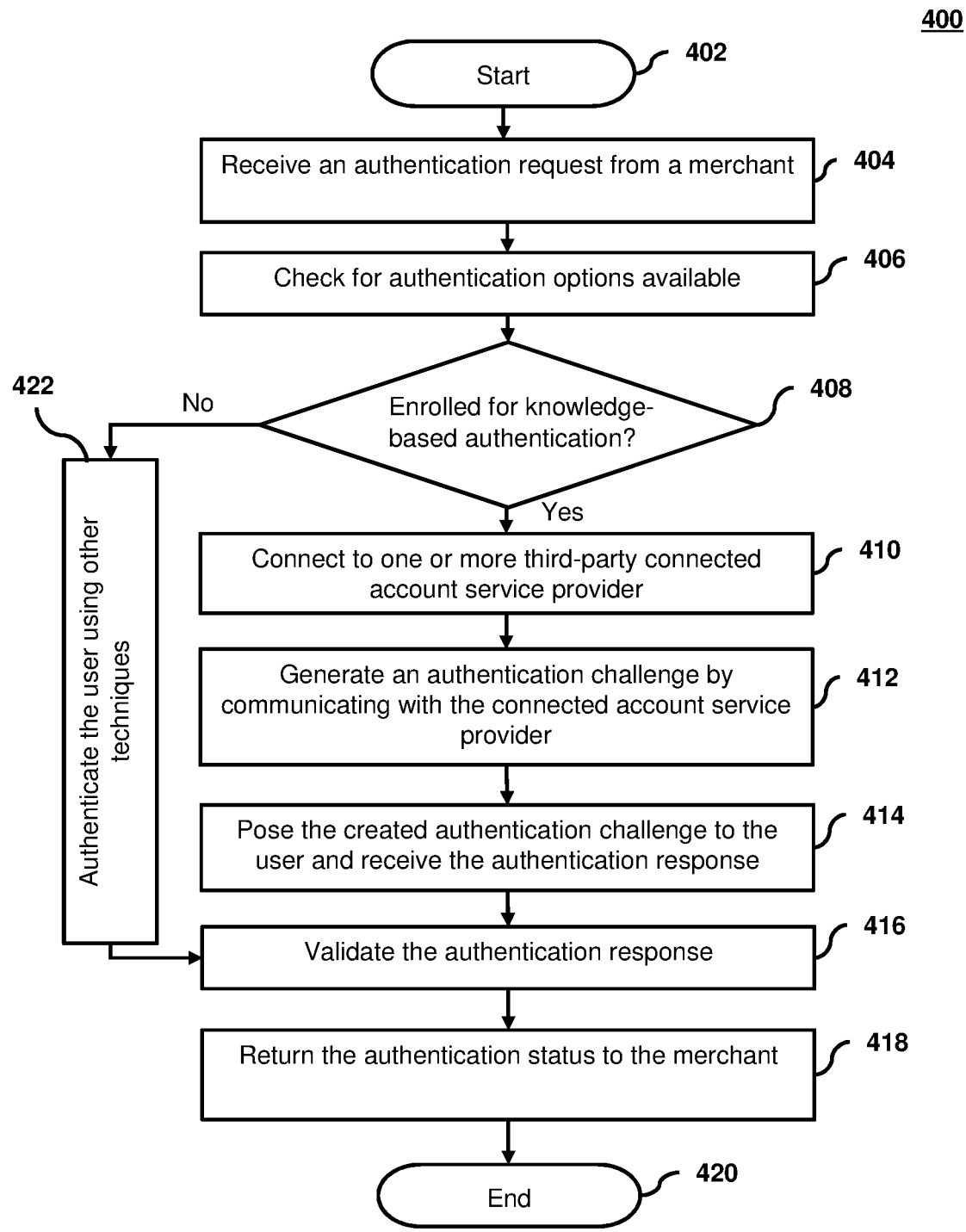
FIG. 4 is a flowchart explaining a method for authenticating a user during a payment transaction, in accordance with one or more embodiments.

FIG. 4 is a flowchart explaining an authentication process 400 for authenticating a user during a payment transaction, in accordance with one or more embodiments. Authentication flow starts at Step 402. The authentication request is received from merchant 112 for requesting to authenticate the user (Step 404). The payment platform checks for the possible mechanisms through which the user can be authenticated (Step 406). For example, the user may be authenticated using SMS-OTP mechanism, behavioral recognition, biometric recognition, dynamic challenge based on the connected account and the like. SMS-OTP mechanism is an authentication form where a password is valid for only one login session or transaction on a portable device. The SMS-OTP is based on time-synchronization between the authentication server and the portable device providing the password which is valid only for a short period of time. Behavioral authentication refers to another form of authentication which is based on uniquely identifying and measurable patterns in human activities. The behavioral authentication maybe implemented by continuously monitoring the user's action and posing an authentication challenge based on the monitored behavior. Likewise, biometric authentication refers to authentication mechanism that is based on the uniquely identifiable biometric patterns of an individual. Examples of the biometric authentication include fingerprint recognition, face recognition, iris recognition and the like.

The authentication module in the payment platform proceeds for conducting an authentication challenge based on the enrolled options by the merchant (Step 408). The payment platform proceeds for either knowledge based authentication based on the connected third-party accounts or using traditional authentication methods at this step. If the merchant is not enrolled for knowledge-based authentication, the authentication is completed using other approached (Step 422). If the merchant is enrolled for knowledge based authentication based on third-party connected accounts, the payment platform fetches the required user details and connects with the required connected account service provider (Step 410) by transmitting an authentication request. Then, an authentication challenge is generated based on the engagement of the user with the connected account (Step 412). The authentication challenge may be generated by the payment platform independently or jointly with the connected account service provider. Once the authentication challenge is generated, the authentication challenge is posed to the user on his or her portable consumer device (Step 414). As described in the above parts, the authentication challenge may be generated by communicating the user details to all the connected third-party service providers, and then posing just one of those challenges generated, or by connecting to only one connected account service provider and posing that generated challenge to the user on the user's portable device. The response from the user is received by the payment platform. Further, the response from the user is validated for determining the authentication status (Step 416). Again, the authentication response may be validated by the payment platform independently or in conjunction with the connected service provider. The authentication status is validated by comparing the user's response with the excepted response which may be available with the payment platform or with the connected account service provider. Once the authentication status is determined, the status is updated to the merchant by the payment platform (Step 418). The authentication process ends at the step 420.

In accordance with the various embodiments of the present disclosure, the computers in the merchant computers, payment platform, issuer systems, and the connected systems may include a bus or other communication mechanism for addressing main memory and for transferring data between and among the various components of device. The computers may also include one or more hardware processors coupled with bus for processing information. A hardware processor may be a general purpose microprocessor, a system on a chip (SoC), or other processor.

Main memory, such as a random access memory (RAM) or other dynamic storage device, also may be coupled to bus for storing information and software instructions to be executed by processor(s). Main memory also may be used for storing temporary variables or other intermediate information during execution of software instructions to be executed by processor(s).

Software instructions, when stored in storage media accessible to processor(s), render computers into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

The computers in the merchant systems, portable consumer device, issuer systems, connected account systems and the providers of the connected account service providers also may include read only memory (ROM) or other static storage device coupled to bus for storing static information and software instructions for processor(s).

One or more mass storage devices may be coupled to bus for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices (e.g., the main hard disk for the device) stores a body of program and data for directing operation of the computing device, including an operating system, user application programs, driver and other support files, as well as other data files of all sorts.

The computers may be coupled via bus to display, such as a liquid crystal display (LCD) or other electronic visual display, for displaying information to a computer user. In some configurations, a touch sensitive surface incorporating touch detection technology (e.g., resistive, capacitive, etc.) may be overlaid on display to form a touch sensitive display for communicating touch gesture (e.g., finger or stylus) input to processor(s).

An input device, including alphanumeric and other keys, may be coupled to bus for communicating information and command selections to processor. In addition to or instead of alphanumeric and other keys, input device may include one or more physical buttons or switches such as, for example, a power (on/off) button, a "home" button, volume control buttons, or the like.

Another type of user input device may be a cursor control, such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

Functions of the disclosed systems, methods, and modules may be performed by computing device in response to processor(s) executing one or more programs of software instructions contained in main memory. Such software instructions may be read into main memory from another storage medium, such as storage device(s). Execution of the software instructions contained in main memory cause processor(s) to perform the functions of the example embodiment(s).

While functions and operations of the example embodiment(s) may be implemented entirely with software instruction(s), hard-wired or programmable circuitry of computing device (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device. Volatile media includes dynamic memory, such as main memory. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus. Transmission media can also take the form of acoustic or light waves, such as those generated during radio-wave and infra-red data communications.

Various forms of media may be involved in carrying one or more sequences of one or more software instructions to processor(s) for execution. For example, the software instructions may initially be carried on a magnetic disk or solid-state drive of a remote computer. The remote computer can load the software instructions into its dynamic memory and send the software instructions over a telephone line using a modem. A modem local to computing device can receive the data on the telephone line and use an infra-red transmitter to convert the data to an infra-red signal. An infra-red detector can receive the data carried in the infra-red signal and appropriate circuitry can place the data on bus. Bus carries the data to main memory, from which processor (s) retrieves and executes the software instructions. The software instructions received by main memory may optionally be stored on storage device(s) either before or after execution by processor(s).

The computers also may include one or more communication interface(s) coupled to bus. A communication interface provides a two-way data communication coupling to a wired or wireless network link that is connected to a local network (e.g., Ethernet network, Wireless Local Area Network, cellular phone network, Bluetooth wireless network, or the like). Communication interface sends and receives electrical, electromagnetic, or optical signals that carry digital data streams representing various types of information. For example, communication interface may be a wired network interface card, a wireless network interface card with an integrated radio antenna, or a modem (e.g., ISDN, DSL, or cable modem).

Network link(s) typically provide data communication through one or more networks to other data devices. For example, a network link may provide a connection through a local network to a host computer or to data equipment operated by an Internet Service Provider (ISP). ISP in turn provides data communication services through the world wide packet data communication network now commonly referred to as the "Internet". Local network(s) and Internet use electrical, electromagnetic or optical signals that carry digital data streams. The signals through the various networks and the signals on network link(s) and through communication interface(s), which carry the digital data to and from computing device, are example forms of transmission media.

The computers can send messages and receive data, including program code, through the network(s), network link(s) and communication interface(s). In the Internet example, a server might transmit a requested code for an application program through Internet, ISP, local network(s) and communication interface(s). The received code may be executed by processor as it is received, and/or stored in storage device, or other non-volatile storage for later execution.

The software systems may be employed for controlling the operation of computing device. Software system and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system is provided for directing the operation of computing device. Software system, which may be stored in system memory (RAM) and on fixed storage (e.g., hard disk or flash memory), includes a kernel or operating system (OS).

The OS manages low-level aspects of computer operation, including managing execution of processes, memory allocation, file input and output (I/O), and device I/O. One or more application programs, may be "loaded" (e.g., transferred from fixed storage into memory) for execution by the system. The applications or other software intended for use on device may also be stored as a set of downloadable computer-executable instructions, for example, for downloading and installation from an Internet location (e.g., a Web server, an app store, or other online service).

Software systems include a graphical user interface (GUI) for receiving user commands and data in a graphical (e.g., "point-and-click" or "touch gesture") fashion. These inputs, in turn, may be acted upon by the system in accordance with instructions from operating system and/or application(s). The GUI also serves to display the results of operation from the OS and application(s), whereupon the user may supply additional inputs or terminate the session (e.g., log off).

In accordance with the embodiments of the present disclosure, the authentication module can execute programs directly on the bare hardware. Alternatively, a hypervisor or virtual machine monitor (VMM) may be interposed between the bare hardware and the operating system of the authentication module. In this configuration, VMM acts as a software "cushion" or virtualization layer between the OS and the bare hardware of the authentication module.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present disclosure have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method, comprising:
receiving, by at least one processor of an authentication system, an authentication request from a computer, wherein the authentication request includes user data associated with a user;
verifying, by the at least one processor of the authentication system, based on the user data, user enrollment for dynamic authentication using one or more third-party account service providers;
sending, by the at least one processor of the authentication system, to the one or more third-party account service providers, a request to extract user-related data based on a set of primitive information associated with the user;

receiving, by the at least one processor of the authentication system, from the one or more third-party account service providers, user-related data, wherein the user-related data is extracted from the one or more third-party account service providers based on the set of primitive information, and wherein the user-related data is associated with user engagement and interaction of the user with one or more third-party connected accounts of the user provided by the one or more third-party account service providers via one or more client facing applications;

generating, by the at least one processor of the authentication system, a plurality of authentication challenges based on the extracted user-related data associated with the user engagement and interaction of the user with the one or more third-party connected accounts of the user provided by the one or more third-party account service providers via the one or more client facing applications;

selecting, by the at least one processor of the authentication system, based on at least one of a device configuration of the user and a location of the user, an authentication challenge out of the plurality of authentication challenges generated by the at least one processor of the authentication system;

predicting, by the at least one processor of the authentication system, using one or more probabilistic models, based on the authentication challenge, a predicted timeframe including an amount of time for the user to provide a response to the authentication challenge;

sending, by the at least one processor of the authentication system, the authentication challenge to a portable consumer device of the user, wherein the authentication challenge is generated based on the extracted user-related data;

waiting, by the at least one processor of the authentication system, the predicted timeframe for the amount of time for the user to provide a response for the authentication challenge;

in response to not receiving, by the at least one processor of the authentication system, a user authentication response in the predicted timeframe, causing, by the at least one processor of the authentication system, the authentication challenge to expire and determining, by the at least one processor of the authentication system, an authentication status as an authentication failure;

in response to receiving, by the at least one processor of the authentication system, a user authentication response to the authentication challenge from the portable consumer device of the user in the predicted timeframe, validating, by the least one processor of the authentication system, the user authentication response, wherein validating the user authentication response comprises comparing the user authentication response with an expected authentication response to determine the authentication status; and returning, by the at least one processor of the authentication system, the authentication status to the computer.

2. The method of claim 1, wherein the user-related data is associated with an item of media content accessible with the one or more third-party connected accounts of the user provided by the one or more third-party account service providers via the one or more client facing applications.

3. The method of claim 2, wherein the item of media content includes a video viewed with a streaming account of the user provided by a streaming service provider via a streaming client facing application.

4. The method of claim 3, wherein the video is a latest video viewed with the streaming account of the user provided by the streaming service provider via the streaming client facing application.

5. The method of claim 2, wherein the item of media content includes a photo stored with a storage service account of the user provided by a storage service provider via a storage service client facing application.

6. The method of claim 2, wherein the item of media content includes media content shared with a social media account of the user provided by a social media provider via a social media client facing application.

7. The method of claim 1, wherein the authentication challenge is generated by an authentication module of a payment platform of the authentication system.

8. The method of claim 1, wherein the authentication challenge is generated by the one or more third-party account service providers.

9. The method of claim 1, wherein the authentication challenge is selected out of the plurality of authentication challenges generated by the at least one processor of the authentication system based on the device configuration of the user and the location of the user, wherein the device configuration of the user includes a type of the portable consumer device of the user and a capability of the portable consumer device of the user, and wherein the expected authentication response is accessible to the user, after the authentication challenge is generated, by the user accessing the one or more third-party connected accounts of the user provided by the one or more third-party account service providers via the one or more client facing applications on the portable consumer device.

10. The method of claim 1, wherein the authentication system includes a payment platform, and wherein the computer includes a merchant computer associated with a merchant.

11. An authentication system, comprising:
at least one processor programmed of the authentication system and/or configured to:
receive an authentication request from a computer, wherein the authentication request includes user data associated with a user;
verify, based on the user data, user enrollment for dynamic authentication using one or more third-party account service providers;
send, to the one or more third-party account service providers, a request to extract user-related data based on a set of primitive information associated with the user;
receive, from the one or more third-party account service providers, user-related data, wherein the user-related data is extracted from the one or more third-party account service providers based on the set of primitive information, and wherein the user-related data is associated with user engagement and interaction of the user with one or more third-party connected accounts of the user provided by the one or more third-party account service providers via one or more client facing applications;
generate a plurality of authentication challenges based on the extracted user-related data associated with the user engagement and interaction of the user with the one or more third-party connected accounts of the user provided by the one or more third-party account service providers via the one or more client facing applications;

select, based on at least one of a device configuration of the user and a location of the user, an authentication challenge out of the plurality of authentication challenges generated by the at least one processor of the authentication system;

predict, using one or more probabilistic models, based on the authentication challenge, a predicted timeframe including an amount of time for the user to provide a response to the authentication challenge;

send the authentication challenge to a portable consumer device of the user, wherein the authentication challenge is generated based on the extracted user-related data;

wait the predicted timeframe for the amount of time for the user to provide a response for the authentication challenge;

in response to not receiving a user authentication response in the predicted timeframe, cause the authentication challenge to expire and determine an authentication status as authentication failure;

in response to receiving the user authentication response to the authentication challenge from the portable consumer device of the user in the predicted timeframe, validate the user authentication response, wherein validating the user authentication response comprises comparing the user authentication response with an expected authentication response to determine the authentication status; and return the authentication status to the computer.

12. The authentication system of claim 11, wherein the user-related data is associated with an item of media content accessible with the one or more third-party connected accounts of the user provided by the one or more third-party account service providers via the one or more client facing applications.

13. The authentication system of claim 12, wherein the item of media content includes a video viewed with a streaming account of the user provided by a streaming service provider via a streaming client facing application.

14. The authentication system of claim 13, wherein the video is a latest video viewed with the streaming account of the user provided by the streaming service provider via the streaming client facing application.

15. The authentication system of claim 12, wherein the item of media content includes a photo stored with a storage service account of the user provided by a storage service provider via a storage service client facing application.

16. The authentication system of claim 12, wherein the item of media content includes media content shared with a social media account of the user provided by a social media provider via a social media client facing application.

17. The authentication system of claim 11, further comprising:
a payment platform including an authentication module, wherein the authentication challenge is generated by the authentication module of the payment platform.

18. The authentication system of claim 11, wherein the authentication challenge is generated by the one or more third-party account service providers.

19. The authentication system of claim 11, wherein the authentication challenge is selected out of the plurality of authentication challenges generated by the at least one processor of the authentication system based on the device configuration of the user and the location of the user, wherein the device configuration of the user includes a type of the portable consumer device of the user and a capability of the portable consumer device of the user, and wherein the expected authentication response is accessible to the user, after the authentication challenge is generated, by the user accessing the one or more third-party connected accounts of the user provided by the one or more third-party account service providers via the one or more client facing applications on the portable consumer device.

20. The authentication system of claim 11, further comprising:
a payment platform, wherein the computer includes a merchant computer associated with a merchant.

* * * * *